United States Patent
Lee

(10) Patent No.: US 8,421,384 B2
(45) Date of Patent: Apr. 16, 2013

(54) DIRECT CURRENT MOTOR CONTROLLING APPARATUS AND METHOD THEREOF

(75) Inventor: Ho-chul Lee, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 458 days.

(21) Appl. No.: 12/561,425

(22) Filed: Sep. 17, 2009

(65) Prior Publication Data

US 2010/0142932 A1   Jun. 10, 2010

(30) Foreign Application Priority Data

Dec. 5, 2008   (KR) .................. 10-2008-0123324

(51) Int. Cl.
*H02P 3/00* (2006.01)

(52) U.S. Cl.
USPC ........... 318/362; 318/292; 318/363; 318/374; 318/375; 318/376; 310/148; 310/151; 310/248

(58) Field of Classification Search ............. 318/400.01, 318/400.32, 400.33, 400.34, 721, 799, 362, 318/375, 268, 280, 292, 272, 255, 264, 376, 318/696, 363, 374; 369/232, 234, 235, 237, 369/44.14, 44.17, 44.19; 310/148, 151, 248
See application file for complete search history.

(56) References Cited

U.S. PATENT DOCUMENTS

| | | | |
|---|---|---|---|
| 5,920,528 A * | 7/1999 | Ohshima et al. | 369/44.29 |
| 6,236,177 B1 * | 5/2001 | Zick et al. | 318/362 |
| 6,617,816 B2 * | 9/2003 | Ohno et al. | 318/560 |
| 6,909,573 B2 * | 6/2005 | Kawabata et al. | 360/75 |
| 7,122,982 B2 * | 10/2006 | Sasaya et al. | 318/293 |
| 2003/0072237 A1 * | 4/2003 | Hashimoto et al. | 369/53.28 |
| 2004/0130282 A1 * | 7/2004 | Meyer et al. | 318/362 |

FOREIGN PATENT DOCUMENTS

| | | |
|---|---|---|
| EP | 1079232 | 2/2001 |
| JP | 59-213261 | 12/1984 |
| JP | 2004-297861 | 10/2004 |

OTHER PUBLICATIONS

European Search Report dated May 3, 2010 issued in EP Application No. 09173314.7.

* cited by examiner

*Primary Examiner* — Antony M Paul
(74) *Attorney, Agent, or Firm* — Stanzione & Kim, LLP

(57) ABSTRACT

A direct current motor controlling apparatus may include a direct current motor driving unit to apply a driving voltage to a direct current motor and detect a predetermined signal from the direct current motor, and a servo-micom to control the status of the direct current motor using the signal detected by the direct current motor driving unit. Accordingly, the rotational status of the direct current motor is checked to control the direct current motor.

14 Claims, 4 Drawing Sheets

DIRECT CURRENT MOTOR CONTROLLING APPARATUS AND METHOD THEREOF

CROSS-REFERENCE TO RELATED APPLICATIONS

This application claims priority under 35 U.S.C.§119 (a) from Korean Patent Application No. 10-2008-0123324, filed on Dec. 5, 2008, in the Korean Intellectual Property Office, the disclosure of which is incorporated herein by reference in its entirety.

BACKGROUND

1. Field of the Invention

The present general inventive concept relates to a direct current motor controlling apparatus and a method thereof, and more particularly, to a direct current motor controlling apparatus which is provided in an optical disk reproducing apparatus to reproduce data recorded on an optical disk, and a method thereof.

2. Description of the Related Art

In general, a direct current motor, which is used as a spindle motor in an optical disk reproducing apparatus, converts incoming electric energy to kinetic energy of a corresponding direction so as to allow data recorded on an optical disk to be read out. The direct current motor has a property of changing the direction of the kinetic energy if the direction of incoming electric current changes. Accordingly, it is possible to control the direct current motor using this property.

In order to control the direct current motor, a rotational direction of the direct current motor should be checked. A conventional method to check the rotational direction of the direct current motor checks a counter electromotive voltage which occurs when the brake voltage of the direct current motor is switched on or off. In this case, since the force exerted to a shaft during the process of switching on or off the direct current motor changes, the rotational force of the shaft changes, causing a great abrasion to a brush and a commutator.

SUMMARY

Exemplary embodiments of the present general inventive concept provide a direct current motor controlling apparatus capable of checking a rotational speed and direction of a direct current motor without causing an abrasion to a brush or a commutator, and a method thereof.

Additional embodiments of the present general inventive concept will be set forth in part in the description which follows and, in part, will be obvious from the description, or may be learned by practice of the general inventive concept.

Exemplary embodiments of the present general inventive concept may be achieved by providing a direct current motor controlling apparatus including a direct current motor having a gap among a plurality of commutators, and a direct current motor driving unit to apply a driving voltage to the direct current motor and detect a gap signal corresponding to the gap from the direct current motor. Additionally, the apparatus may include a servo-micom to analyze the gap signal detected by the direct current motor driving unit and control the direct current motor driving unit to drive the direct current motor.

The direct current motor driving unit may amplify the gap signal and output the amplified gap signal.

The direct current motor driving unit may include a driving signal generator to apply voltages to two brushes included in the direct current motor according to a control of the servo-micom, and an operational amplifier to amplify and output the gap signal.

The gap signal may be a signal which is generated when one of the two brushes passes through the gap.

The servo-micom may determine that the direct current motor performs a brake if a period during which the gap signal is in a high state becomes larger.

If the gap signal continues to be in a low state for a predetermined time and then returns to a high state, the servo-micom may determine that the direct current motor is stopped and control the direct current motor driving unit to interrupt the driving voltage supplied to the direct current motor.

Exemplary embodiments of the present general inventive concept may also be achieved by providing a method of controlling a direct current motor, the method including applying a driving voltage to the direct current motor which has a gap among a plurality of commutators and detecting a gap signal corresponding to the gap from the direct current motor.

The method may further include analyzing the gap signal detected by a direct current motor driving unit, and controlling the direct current motor to be driven according to the result of analysis.

The method may further include amplifying and outputting the gap signal after detecting the gap signal.

The applying the driving voltage to the direct current motor may include applying voltages to two brushes included in the direct current motor.

The gap signal may be a signal which is generated when one of the two brushes passes through the gap.

The analyzing may include determining that the direct current motor performs a brake if a period during which the gap signal is in a high state becomes larger.

The analyzing may include determining that the direct current motor is stopped if the gap signal continues to be in a low state for a predetermined time and then returns to a high state.

The analyzing may further include controlling the driving voltage applied to the direct current motor to be interrupted according to the result of determination.

Exemplary embodiments of the present general inventive concept may be achieved by providing an optical disk drive motor apparatus including a direct current motor having a gap among a plurality of commutators, and a controlling unit to apply a driving voltage to the direct current motor and detect a gap signal corresponding to the gap from the direct current motor and to control the direct current motor.

The direct current motor driving unit may include a a servo-micom to analyze the gap signal and adjust the driving voltage.

The direct current motor driving unit may amplify the gap signal and output the amplified gap signal.

Exemplary embodiments of the present general inventive concept may be achieved by providing an optical disk drive motor apparatus including a disk loading unit to receive a disk; a disk read and/or write unit to read from or write to the disk; a direct current motor to turn the disk, the direct current motor having a gap among a plurality of commutators; a controlling unit to apply a driving voltage to the direct current motor and detect a gap signal corresponding to the gap from the direct current motor and to control the direct current motor; and an input and/or output unit to communicate data read from or written to the disk by the disk read and/or write unit.

BRIEF DESCRIPTION OF THE DRAWINGS

These and/or other features and advantages of the present general inventive concept will become apparent and more BRIEF DESCRIPTION OF THE DRAWINGS is continuing...

DETAILED DESCRIPTION OF THE EMBODIMENTS

Figure 1:
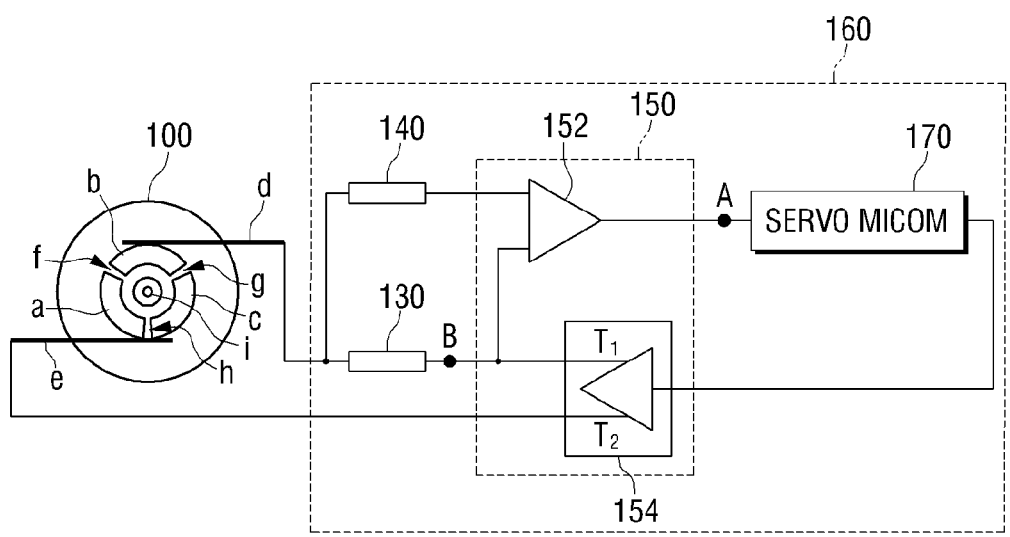
FIG. 1 is a schematic view illustrating a direct current motor controlling apparatus according to an exemplary embodiment of the present general inventive concept.

Reference will now be made in detail to various exemplary embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a schematic view illustrating a motor controlling apparatus according to an exemplary embodiment of the present general inventive concept. The motor controlling apparatus of FIG. 1 may be a direct current motor apparatus. However, the present general inventive concept is not limited thereto.

Referring to FIG. 1, a direct current motor 100 may include a plurality of commutators 'a', 'b', and 'c', a first brush 'd', and a second brush 'e'. Gaps 'f', 'g', and 'h' are formed among the commutators 'a', 'b', and 'c'. Although FIG. 1 illustrates three commutators 'a', 'b', and 'c', it is possible that direct current motor 100 may include a number of commutators other than three.

The commutators 'a', 'b', and 'c' may be disposed around a rotation axis of a rotation shaft 'i' along a circumferential direction and spaced apart from each other by the gaps 'f', 'g', and 'h'. The gaps 'f', 'g', and 'h' may be the same. However, it is possible that the gaps 'f', 'g', and 'h' may be different.

A voltage having an electric potential difference can be applied between the first brush 'd' and the second brush 'e' so that the commutators 'a', 'b', and 'c' rotate or stop the direct current motor 100 with respect to the rotational axis 'i'.

For example, if a voltage of +3V is applied to the first brush 'd' and a voltage of −3V is applied to the second brush 'e', the direct current motor 100 is rotated in a predetermined direction. In the meantime, if a voltage of −3V is applied to the first brush 'd' and a voltage of +3V is applied to the second brush 'e', the direct current motor 100 gradually decelerates and is rotated in the opposite direction.

A direct current motor driving unit 150 may include a driving signal generator 154 and an operational amplifier 152. The driving signal generator 154 applies voltages to the first brush 'd' and the second brush 'e' according to the control of a servo-micom 170, which will be described later. The operational amplifier 152 amplifies the signal at point B and outputs the signal at point A. The waveforms of the signals at points A and B will be described with reference to FIGS. 2A and 2B.

When the driving signal generator 154 applies a voltage of +3V to the first brush 'd' through a terminal T1 and a voltage of −3V to the second brush 'e' through a terminal T2, rotating the direct current motor 110 in a predetermined direction, if a brake command is received at the servo-micom 170, the driving signal generator 154 applies a voltage of −3V to the first brush 'd' and a voltage of +3V to the second brush 'e' through corresponding terminals T1 and T2 according to the control of the servo-micom 170. At this time, when the first brush 'd' passes through the gaps 'f', 'g', 'h', a reverse voltage is generated by a varistor 140.

Due to the reverse voltage, a minute electric potential difference can be found between the output of the driving signal generator 154 and the first brush 'd'. That is, the reverse voltage generated at the time that the first brush 'd' passes through the gaps 'f', 'g', 'h' becomes higher than the voltage output from the driving signal generator 154, and the reverse voltage is detected by a load resistor 130 and amplified at the operational amplifier 152. The signal detected by the load resistor 130 is called the "gap signal".

The servo-micom 170 analyzes the gap signal output from the direct current motor driving unit 150 and controls the driving signal generator 154 to control the rotational direction of the direct current motor 100. That is, if a brake command is received when the direct current motor 100 is rotated in a predetermined direction, the servo-micom 170 controls the driving signal generator 154 to rotate the direct current motor 100 in the opposite direction. At this time, the servo-micom 170 analyzes the gap signal output from the operational amplifier 152 and determines the rotational status of the direct current motor 100, and then controls the driving signal generator 154 to interrupt the power supplied to the direct current motor 100. In combination, the driving unit 150 and the servo-micom 170 make up a controlling unit 160.

As described above, using the reverse voltage which is generated at the time that the first brush 'd' passes through the gaps 'f', 'g', 'h', the rotational direction of the direct current motor 100 can be checked without requiring an extra sensor.

Figure 2A:
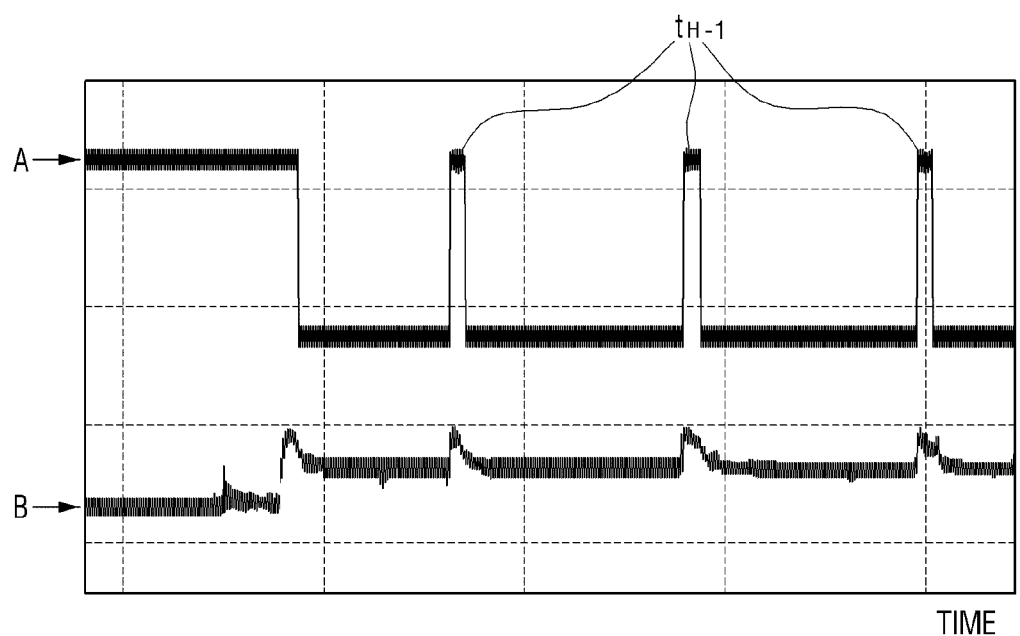
FIGS. 2A and 2B are views illustrating waveforms of a gap signal detected during the operation of the direct current motor according to an exemplary embodiment of the present general inventive concept.
Figure 2B:
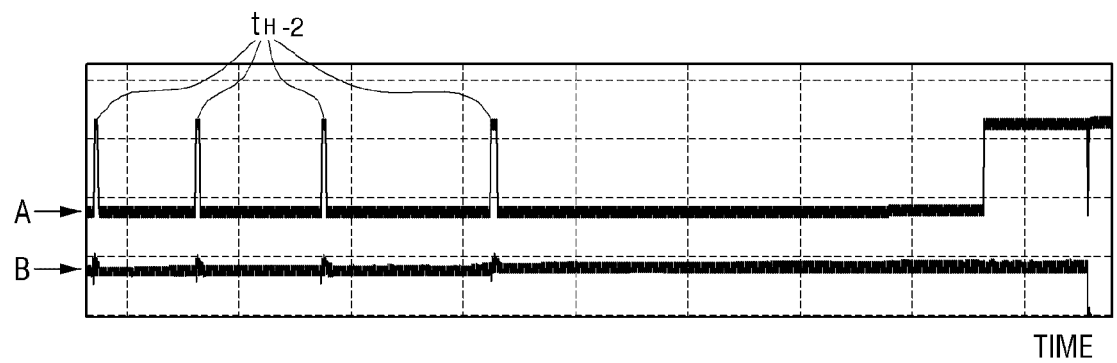

FIGS. 2A and 2B are views illustrating waveforms of the gap signal detected during the operation of the direct current motor according to an exemplary embodiment of the present general inventive concept.

FIG. 2A illustrates waveforms of signals at the points A and B when the direct current motor 100 receives a command to begin. The signal detected at point B of FIG. 1 is amplified by passing through the operational amplifier 152 and the amplified signal is output as a square waveform at point A. That is, at the time that the first brush 'd' passes through the gaps 'f', 'g', 'h', the servo-micom 170 receives the amplified gap signal so as to be able to check the rotational direction of the direct current motor 100. In normal operation, the time period $t_{H-1}$, during which the gap signal is in a high state, is 7 ms, for example. The time period $t_{H-1}$ is proportional to a width of the corresponding gap 'f', 'g', or 'f'. The time $t_{H-1}$ may vary according to a width of the gap 'f', 'g', or 'h'.

FIG. 2B illustrates waveforms of signals at points A and B when the direct current motor 100 receives a command to brake. If a brake command is received when the direct current motor is being rotated in a predetermined direction, the driving signal generator 154 applies voltages to the first brush 'd' and the second brush 'e' inversely according to the control of the servo-micom 170. Then, as shown in FIG. 2B, the time period of the gap signal of $t_{H-2}$=7 ms, for example, becomes larger than the received $t_{H-1}$ and the low state continues for a predetermined time. Then, when the direct current motor 100 is being rotated in the opposite direction, if a high state is detected for a predetermined period, it is determined that the rotation of the direct current motor 100 terminates and the power supplied to the direct current motor 100 is interrupted.

As described above, the servo-micom 170 can check the rotational status of the direct current motor 100 using the gap signal and also stop the direct current motor 100. Therefore, servo-micom 170 may control the direction, speed, or characteristic of the motor 100 according to the characteristic of the pulse in the gap signal.

Figure 3:
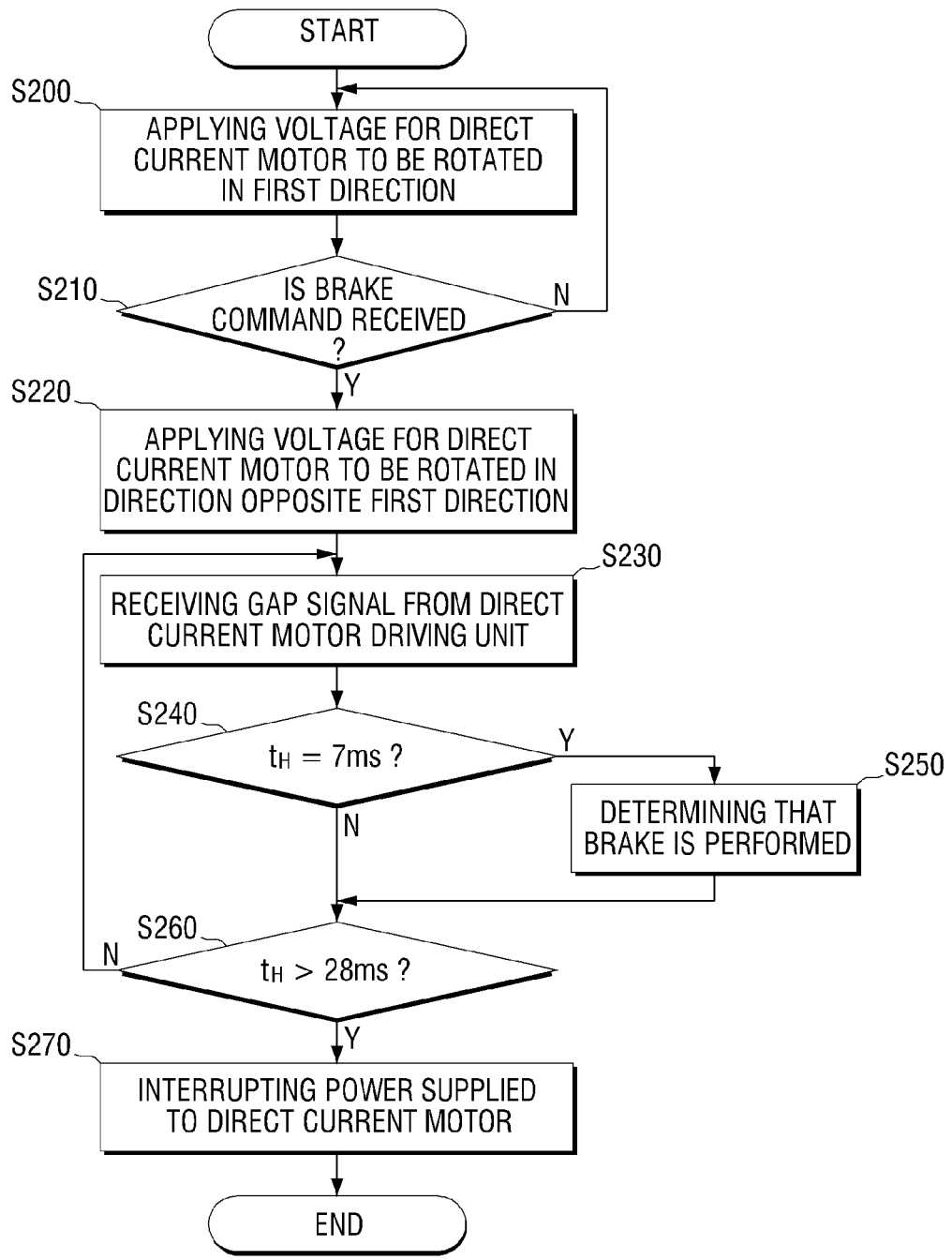
FIG. 3 is a flowchart illustrating a method for controlling a direct current motor according to an exemplary embodiment of the present general inventive concept.

FIG. 3 is a flowchart illustrating a method for controlling the direct current motor according to an exemplary embodiment of the present general inventive concept. The method of FIG. 3 corresponds to the waveform shown in FIG. 2B.

Referring to FIG. 3, a voltage is applied for the direct current motor 100 to be rotated in a first direction in operation S200. That is, the servo-micom 170 controls the driving signal generator 154 to apply voltages to the first brush 'd' and the second brush 'e'.

In operation 210, if a brake command is received, a voltage is applied for the direct current motor 100 to be rotated in a direction opposite the first direction in operation S220. That is, the servo-micom 170 controls the driving signal generator 154 to apply voltages opposite to those in the operation S200 to the first brush 'd' and the second brush 'e'.

Also, the servo-micom 170 receives a gap signal from the direct current motor driving unit 150 in operation S230 and determines whether the time $t_H$, during which the gap signal is in a high state, is 7 ms, for example, or not in operation S240. If $t_H$=7 ms in operation S240-Y, the servo-micom 170 determines that the brake is performed in operation S250. In other words, during the time $t_H$=7 ms, the direct current motor 100 gradually decelerates.

If the time $t_H$, during which the gap signal is in a high state, is greater than a predetermined time, for example, 28 ms, in operation S260-Y, the servo-micom 170 interrupts the power supplied to the direct current motor 100 in operation S270. If $t_H$>28 ms, the direct current motor 100 begins to be rotated inversely, and the servo-micom 170 controls the direct current motor driving unit 150 to interrupt the power supplied to the direct current motor 100.

If $t_H$ is not equal to 7 ms in operation S240 (S240-N) and if $t_H$ is not greater than 28 ms in operation S260 (S260-N), the method returns to the operation S230, and receives the gap signal measurement again.

Through the above-described process, the servo-micom 170 checks the rotational status of the direct current motor 100 and stops the direct current motor 100.

Figure 4:
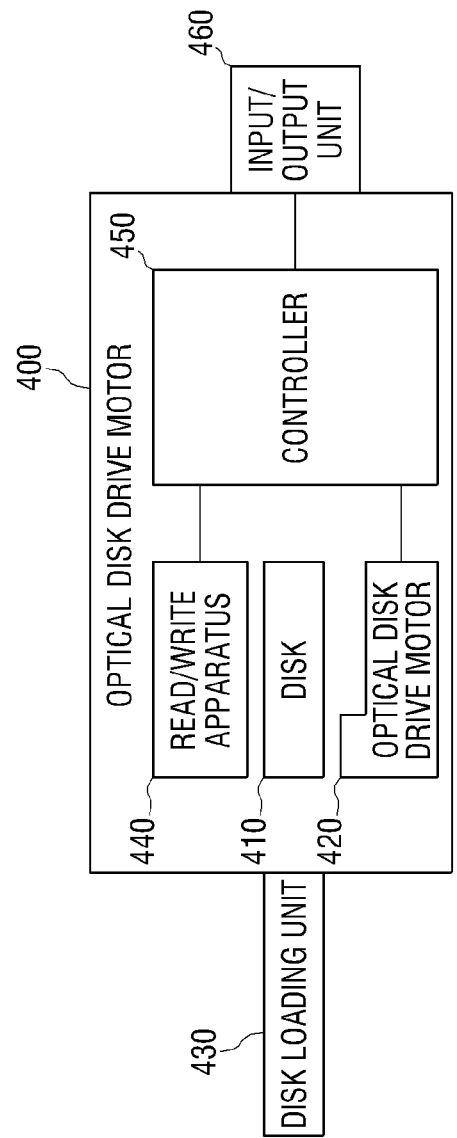
FIG. 4 illustrates an optical disk drive motor controlling apparatus according to an exemplary embodiment of the present general inventive concept.

FIG. 4 illustrates an optical disk drive apparatus according to an exemplary embodiment of the present general inventive concept.

Referring to FIG. 4, an optical disk drive 400 may include a disk 410 that is turned by an optical disk drive motor 420. The optical disk drive apparatus of FIGS. 1-3 may use the optical disk drive motor 420 and may be a direct current motor apparatus to rotate the disk 410 and control rotation of the disk 410. However, the present general inventive concept is not limited thereto. The disk 410 may be loaded via a disk loading unit 430. The disk 410 may be read by or written to by a read/write apparatus 440. The optical disk drive motor 420 may be controlled by a controller 450 that may also control the read/write apparatus 440. Although FIG. 4 illustrates a single controller 450 to control both the optical disk drive motor 420 and the read/write apparatus 440, it is possible that separate controllers may control the optical disk drive motor 420 and the read/write apparatus 440. The optical disk drive may include an input/output unit 460 that communicates data with an input device and/or an output device.

The optical disk drive motor 420 and the controller 450 are described hereinabove in FIGS. 1-3, and may include commutators having gaps between them. Thus, the rotational status of the optical disk drive motor 420 can be checked using a gap signal.

The optical disk drive 400 of FIG. 4 may be used in a standalone device such as a compact disk (CD) or digital versatile disk (DVD) player or may be used in conjunction with a system, such as, e.g., a CD-ROM, DVD-ROM, CD-RW, or DVD-RW. The optical disk drive 400 is not limited to the uses described herein.

According to the exemplary embodiments of the present general inventive concept, the gap signal generated when the brush of the direct current motor 100 passes through the gaps among the commutators is detected and is used to check the rotational status of the direct current motor 100.

Although various example embodiments of the present general inventive concept have been illustrated and described, it will be appreciated by those skilled in the art that changes may be made in these example embodiments without departing from the principles and spirit of the general inventive concept, the scope of which is defined in the appended claims and their equivalents.

What is claimed is:

1. A direct current motor controlling apparatus comprising:
 a direct current motor having a gap among a plurality of commutators; and
 a controlling unit to apply a driving voltage to the direct current motor and detect a gap signal corresponding to the gap from the direct current motor and to analyze the gap signal and adjust the driving voltage, the controlling unit determining that the direct current motor performs a brake if a period during which the gap signal is in a high state becomes larger,
 wherein, if the gap signal continues to be in a low state for a predetermined time and then returns to a high state, the controlling unit determines that the direct current motor is stopped and interrupts the driving voltage supplied to the direct current motor.

2. The direct current motor controlling apparatus as claimed in claim 1, wherein the controlling unit amplifies the gap signal and outputs the amplified gap signal.

3. The direct current motor controlling apparatus as claimed in claim 1, wherein the controlling unit comprises:
 a driving signal generator to apply voltages to two brushes included in the direct current motor; and
 an operational amplifier to amplify and output the gap signal.

4. The direct current motor controlling apparatus as claimed in claim 3, wherein the gap signal is a signal which is generated when one of the two brushes passes through the gap.

5. A method of controlling a direct current motor, the method comprising:
 applying a driving voltage to the direct current motor which has a gap among a plurality of commutators;
 detecting a gap signal corresponding to the gap from the direct current motor;
 analyzing the gap signal detected by a controlling unit; and
 the analyzing including determining that the direct current motor performs a brake if a period during which the gap signal is in a high state becomes larger; and
 controlling the direct current motor to be driven according to the result of analysis,
 wherein, if the gap signal continues comprises determining that the direct current motor is stopped and interrupting the driving voltage supplied to the direct current motor.

6. The method as claimed in claim 5, further comprising:
amplifying and outputting the gap signal after detecting the gap signal.

7. The method as claimed in claim 5, wherein the applying of the driving voltage to the direct current motor comprises:
applying voltages to two brushes included in the direct current motor.

8. The method as claimed in claim 7, wherein the gap signal is a signal which is generated when one of the two brushes passes through the gap.

9. An optical disk drive motor apparatus comprising:
a direct current motor having a gap among a plurality of commutators; and
a controlling unit to apply a driving voltage to the direct current motor and detect a gap signal corresponding to the gap from the direct current motor and to control the direct current motor, the controlling unit determining that the direct current motor performs a brake if a period during which the gap signal is in a high state becomes larger,
wherein, if the gap signal continues to be in a low state for a predetermined time and then returns to a high state, the controlling unit determines that the direct current motor is stopped and interrupts the driving voltage supplied to the direct current motor.

10. The optical disk drive motor apparatus as claimed in claim 9, wherein the controlling unit comprises:
a servo-micom to analyze the gap signal and adjust the driving voltage.

11. The optical disk drive motor apparatus as claimed in claim 9, wherein the direct current motor driving unit amplifies the gap signal and outputs the amplified gap signal.

12. An optical disk drive apparatus comprising:
a disk loading unit to receive a disk;
a disk read and/or write unit to read from or write to the disk;
an optical disk drive motor apparatus comprising:
a direct current motor to turn the disk, the direct current motor having a gap among a plurality of commutators, and
a controlling unit to apply a driving voltage to the direct current motor and detect a gap signal corresponding to the gap from the direct current motor and to control the direct current motor; the controlling unit determining that the direct current motor performs a brake if a period during which the gap signal is in a high state becomes larger; and
an input and/or output unit to communicate data read from or written to the disk by the disk read and/or write unit,
wherein, if the gap signal continues to be in a low state for a predetermined time and then returns to a high state, the controlling unit determines that the direct current motor is stopped and interrupts the driving voltage supplied to the current motor.

13. A method of controlling an optical disk drive apparatus, the method comprising:
applying a driving voltage to a direct current motor which has a gap among a plurality of commutators;
detecting a gap signal corresponding to the gap from the direct current motor;
controlling the direct current motor to be driven according to the result of analysis result; and
determining that the direct current motor performs a braking operation if a period during which the gap signal is in a high state becomes larger.
determining that the direct current motor is stopped and interrupting the driving voltage supplied to the direct current motor, when the gap signal continues to be in a low state for a predetermined time and then returns to a high state.

14. A method of controlling an optical disk drive apparatus, the method comprising:
receiving a disk;
turning the disk by a direct current motor having a gap among a plurality of commutators;
applying a driving voltage to the direct current motor and detecting a gap signal corresponding to the gap from the direct current motor;
controlling the direct current motor; and determining that the direct current motor performs a braking operation if a period during which the gap signal is in a high state becomes larger; and
reading from or writing to the disk.
wherein, if the gap signal continues to be in a low state for a predetermined time and the returns to a high state, the controlling comprises determining that the direct current motor is stopped and interrupting the driving voltage supplied to the direct current motor.

* * * * *